(12) United States Patent
Norris

(10) Patent No.: US 11,099,083 B2
(45) Date of Patent: Aug. 24, 2021

(54) AIRCRAFT OVERHEAT DETECTION THROUGH FIBER OPTIC MONITORING OF LIGHT REFLECTANCE CHANGING TEMPERATURE STRIPS

(71) Applicant: Kidde Technologies, Inc., Wilson, NC (US)

(72) Inventor: Robert J. Norris, Zebulon, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 127 days.

(21) Appl. No.: 16/352,906

(22) Filed: Mar. 14, 2019

(65) Prior Publication Data
US 2020/0292398 A1    Sep. 17, 2020

(51) Int. Cl.
*G01K 11/32*    (2021.01)
*B64D 45/00*    (2006.01)
*G02B 6/42*    (2006.01)
*H04B 10/071*    (2013.01)

(52) U.S. Cl.
CPC .............. *G01K 11/32* (2013.01); *B64D 45/00* (2013.01); *G02B 6/4266* (2013.01); *H04B 10/071* (2013.01); *B64D 2045/0085* (2013.01)

(58) Field of Classification Search
CPC ...... G01K 11/32; B64D 45/00; G02B 6/4266; H04B 10/071
USPC .................................................... 250/227.14
See application file for complete search history.

(56) References Cited

U.S. PATENT DOCUMENTS

| | | | |
|---|---|---|---|
| 4,278,349 A * | 7/1981 | Sander | G01K 11/12 356/44 |
| 2011/0044575 A1 * | 2/2011 | Lagakos | G01K 5/62 385/12 |
| 2016/0069936 A1 | 3/2016 | Harlev et al. | |
| 2017/0191107 A1 * | 7/2017 | Martini | B01L 3/5085 |
| 2018/0192887 A1 | 7/2018 | Ye et al. | |
| 2019/0277709 A1 * | 9/2019 | Miller | G01K 3/005 |

FOREIGN PATENT DOCUMENTS

| | | |
|---|---|---|
| CN | 100526821 C | 8/2009 |
| CN | 201716126 U | 1/2011 |
| JP | S61212736 A | 9/1986 |
| JP | 0953997 A1 | 2/1997 |
| KR | 2003053074 A | 6/2003 |
| KR | 1499918 B1 | 3/2015 |

OTHER PUBLICATIONS

European Search Report; European Application No. 19210902.3; Application Filed: Nov. 22, 2019; Search Report dated Jul. 3, 2020; 7 pages.

* cited by examiner

*Primary Examiner* — Kevin K Pyo
(74) *Attorney, Agent, or Firm* — Cantor Colburn LLP

(57) ABSTRACT

Provided are embodiments including a system for performing aircraft overheat detection using fiber optic monitoring of light reflectance changing temperature strips. Embodiments also include a sensing strip configured to detect a temperature of an object, a controller configured to monitor the sensing strip, and a fiber optic cable configured to transmit or receive a light signal to the sensing strip, wherein the fiber optic cable is operably coupled to the sensing strip and the controller. Embodiments also include a method for operating an aircraft overheat detection system.

16 Claims, 3 Drawing Sheets

AIRCRAFT OVERHEAT DETECTION THROUGH FIBER OPTIC MONITORING OF LIGHT REFLECTANCE CHANGING TEMPERATURE STRIPS

BACKGROUND

The present invention relates to overheat detection, and more specifically, to aircraft overheat detection through fiber optic monitoring of light reflectance changing temperature strips.

Aircraft include various equipment and sensors to monitor and ensure the proper operation of the different systems and subsystems. The sensors can be used to monitor the operating conditions including pressure, temperature, vibration, and other conditions. If a condition is detected that is outside of an operating range, different notifications and alarms can be generated to notify the proper personnel of the current condition.

BRIEF DESCRIPTION

According to an embodiment, a system for performing aircraft overheat detection using fiber optic monitoring of light reflectance changing temperature strips is provided. The system includes a sensing strip configured to detect a temperature of an object, a controller configured to monitor the sensing strip, and a fiber optic cable configured to transmit or receive a light signal to the sensing strip, wherein the fiber optic cable is operably coupled to the sensing strip and the controller.

In addition to one or more of the features described herein, or as an alternative, further embodiments include a light-emitting diode that is configured to provide a light source to transmit the light signal to the sensing strip.

In addition to one or more of the features described herein, or as an alternative, further embodiments include a photodiode that is configured to detect light, wherein the photodiode is coupled to the fiber optic cable.

In addition to one or more of the features described herein, or as an alternative, further embodiments include a housing, wherein the housing enclosing the sensing strip and a portion of the fiber optical cable used to transmit and receive the light signal.

In addition to one or more of the features described herein, or as an alternative, further embodiments include a first sensing strip and a second sensing strip to provide a redundant architecture.

In addition to one or more of the features described herein, or as an alternative, further embodiments include a fiber optic cable bundle that includes one or more transmit fiber optic cable(s) and one or more receive fiber optic cable(s).

In addition to one or more of the features described herein, or as an alternative, further embodiments include a fiber optic cable that is coupled to an optical switch and the fiber optic cable transmits and receives the light signal.

In addition to one or more of the features described herein, or as an alternative, further embodiments include a sensing strip that has a plurality of regions that are activated according to corresponding temperature thresholds.

In addition to one or more of the features described herein, or as an alternative, further embodiments include a sensing strip that is selected according to a range of temperatures to be monitored.

According to another embodiment, a method for operating an overheat detection is provided. The method includes transmitting a first signal to a sensing strip, receiving a second signal from the sensing strip, determining a thermal state of the sensing strip based at least in part on the sensing strip, comparing the thermal state to a threshold value, and providing an alarm based at least in part on the comparison.

In addition to one or more of the features described herein, or as an alternative, further embodiments include verifying connectivity of the overheat detection system by transmitting and receiving light signals, and analyzing the relative signal amplitudes.

In addition to one or more of the features described herein, or as an alternative, further embodiments include monitoring the thermal state of the sensing strip at a periodic rate.

In addition to one or more of the features described herein, or as an alternative, further embodiments include comparing a first sensing strip and a second sensing strip, and providing an alarm based at least in part on the comparison.

In addition to one or more of the features described herein, or as an alternative, further embodiments include providing an alarm based at least in part on the comparison.

In addition to one or more of the features described herein, or as an alternative, further embodiments include a fiber optic cable that is used to transmit the first signal and receive the second signal.

In addition to one or more of the features described herein, or as an alternative, further embodiments include a fiber optic cable that is used to transmit the first signal and a separate fiber optic cable to receive the second signal.

In addition to one or more of the features described herein, or as an alternative, further embodiments include a sensing strip that has a plurality of regions that are activated according to corresponding temperature thresholds.

In addition to one or more of the features described herein, or as an alternative, further embodiments include selecting a sensing strip based on a range of temperatures to be monitored.

In addition to one or more of the features described herein, or as an alternative, further embodiments include transmitting a first signal using a light-emitting diode as a light source to transmit the first signal to the sensing strip.

In addition to one or more of the features described herein, or as an alternative, further embodiments include where receiving a second signal from the sensing strip using a photodiode to receive the second signal.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Modern aircraft are constructed using increasing amounts of composite content to decrease the weight and overall load of the aircraft. One aspect of using composite materials is their limited ability to operate at a high temperatures compared with traditional metal structures. In fact, temperatures of less than 50 degrees Celsius above the expected maximum operating temperature of the composite structure can result in the loss of its structural integrity.

Overheat detection systems can be used to monitor various portions of the aircraft that incorporate the composite material. For example, overheat detection systems are commonly used on the aircraft with particular attention given to the bleed air ducts which direct hot air from the turbines to the wing anti-icing and the environmental control systems. Other areas of the aircraft outside of these systems can also experience excessive temperatures, but since these areas are not monitored these temperature excursions would not be detected. Identifying weakened, but not failed composite structures is a non-trivial task so the condition could exist for long periods.

The techniques described herein provide a low cost, light weight, and electrically robust means of establishing additional overheat protection through an aircraft is proposed through the use of fiber optic cables coupled to a small, enclosed housing containing temperature sensing strips that change color or light reflectance based on the sensed temperature. These temperature sensors provide a low-cost means of determining temperature under certain conditions. Advances in accuracy and temperature range now make such sensors a viable option to protect non-fire zones of the aircraft.

Figure 1:
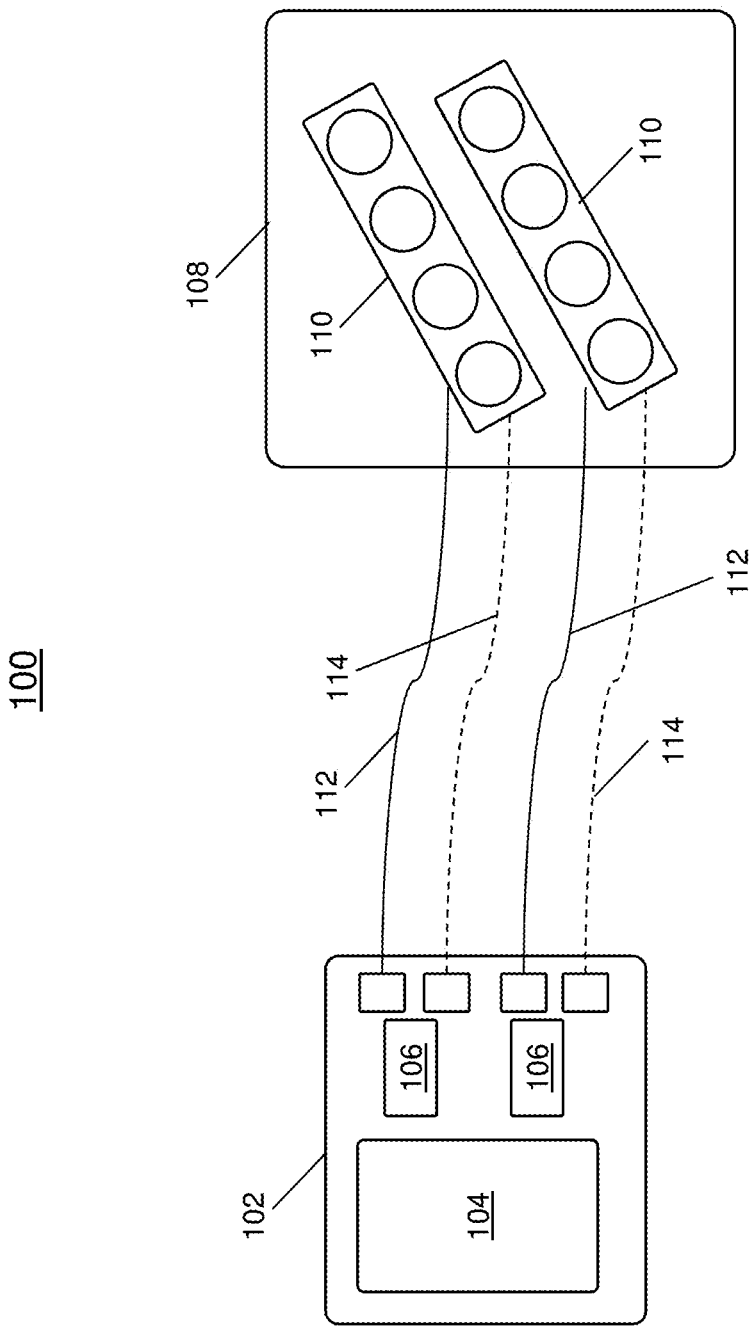
FIG. 1 is a system for aircraft overheat detection through fiber optic monitoring of light reflectance changing temperature strips.

FIG. 1 depicts a system 100 for performing overheat detection. The system 100 includes a monitoring electronics box 102 which includes a controller 104. The monitoring electronics box 102 can also include a processor, memory, and other components (not shown) for operating the overheat detection system 100. The monitoring electronics box 102 also includes a light source such as the LED 106.

In one or more embodiments, the sensing strip 110 can detect different temperature ranges. The sensing strip 110 includes a plurality of regions that can change color upon reaching certain threshold temperatures. In some design architectures, redundant sensing strips 110 can be used to compare readings among the sensing strips 110 to provide a warning, fault, or alarm state. In some embodiments, the controller 104 can be configured with various threshold levels and compare the readings from the sensing strips 110 to the thresholds to provide the appropriate alert.

In one or more embodiments, the connection 112, 114 can be a fiber optic cable. The connection 112 can be used as transmit cables which are optically coupled to the LED 106 to transmit a light signal to the sensing strip 110. The light from the connection 112 is provided to the sensing strip 110 and used to detect the current color or reflectance of the sensing strip 110. The connection 114 can be used as a receive cable which can be optically coupled to a receiver such as a photodiode to detect the light reflectance of the sensing strip 110.

The different portions of the sensing strip 110 can indicate overheat condition or varying degrees of temperature ranges. The light from the LED source reflected off of the sensing strip 110. The sensing strip 110 changes in color or reflectance if the detected temperature is sufficient to activate one or more threshold portions of the sensing strip. The indication can be used to initiate the appropriate action such as maintenance to correct the issue.

In a configuration where multiple sensing strips 110 are used, separate readings can be used to avoid false alarms. Any mismatches can be reported by the monitoring device as a fault condition where matching readings can provide a reliable reading for a fault or failed state.

In one or more embodiments, a pair of fiber optic cables 112, 114 are used to transmit and receive the light from the sensing strip 110. In some embodiments, a single fiber optic can be used to transmit and receive the light by using an optical switch.

In one or more embodiments, the housing 108 can be composed of metal or other material. The housing 108 also functions to prevent the ingress of moisture, dust, and other environmental effects while providing sufficiently high thermal energy transfer to support fast response times. The housing 108 can also be configured to obtain a reliable light signal from the sensing strip 110.

The techniques described herein provide an additional level of safety diagnostics with little added cost or weight impact, multiple temperature thresholds could be provided on each sensor strip and monitored by the same or additional fiber optic cables to determine observed temperature ranges at the housing rather than a single threshold.

Figure 2:
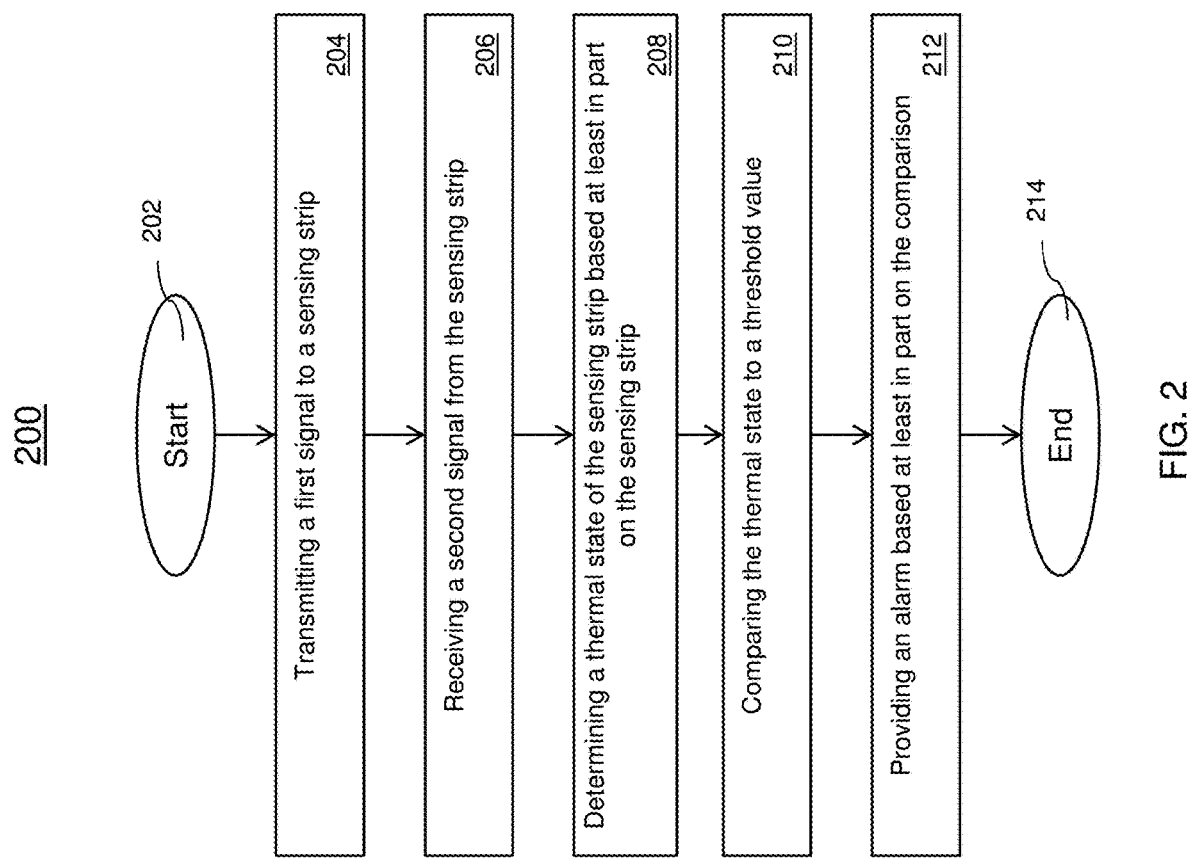
FIG. 2 is a method of operating an aircraft overheat detection system in accordance with one or more embodiments.

Now referring to FIG. 2, a flowchart of a method 200 for operating an aircraft overheat detection through fiber optic monitoring of light reflectance changing temperature strips is shown. The method 200 begins at block 202 and proceeds to block 204 which provides for transmitting a first signal to a sensing strip. In one or more embodiments, the sensing strip can be affixed to the surface to be monitored where the sensing strip will change color responsive to reaching a threshold temperature. A light source, such as an LED, transmits a light signal (first signal) through a fiber optic cable and provides it to the sensing strip to determine a color of the sensing strip.

Block 206 provides for receiving a second signal from the sensing strip. In some embodiments, a receiver, such as a photodiode, receives a reflectance light signal (second signal) from the sensing strip through a fiber optic cable. The method 200 at block 208 provides for determining a thermal state of the sensing strip based at least in part on the sensing strip. The color of the sensing strip can be correlated to a threshold temperature to determine the thermal state of the surface the sensing strip is affixed to.

At block 210, the thermal state of the sensing strip is compared to a threshold value. The method 200 proceeds to block 212 and provides an alarm based at least in part on the comparison. For example, if a particular threshold is reached a warning indicating a pre-failed state (weakened state) or an alarm state (critical state) can be provided. It should be understood that other levels of faults or alarms can be used and coordinated with the various temperature threshold levels of the sensing strip. The method 200 ends at block 214.

Figure 3:
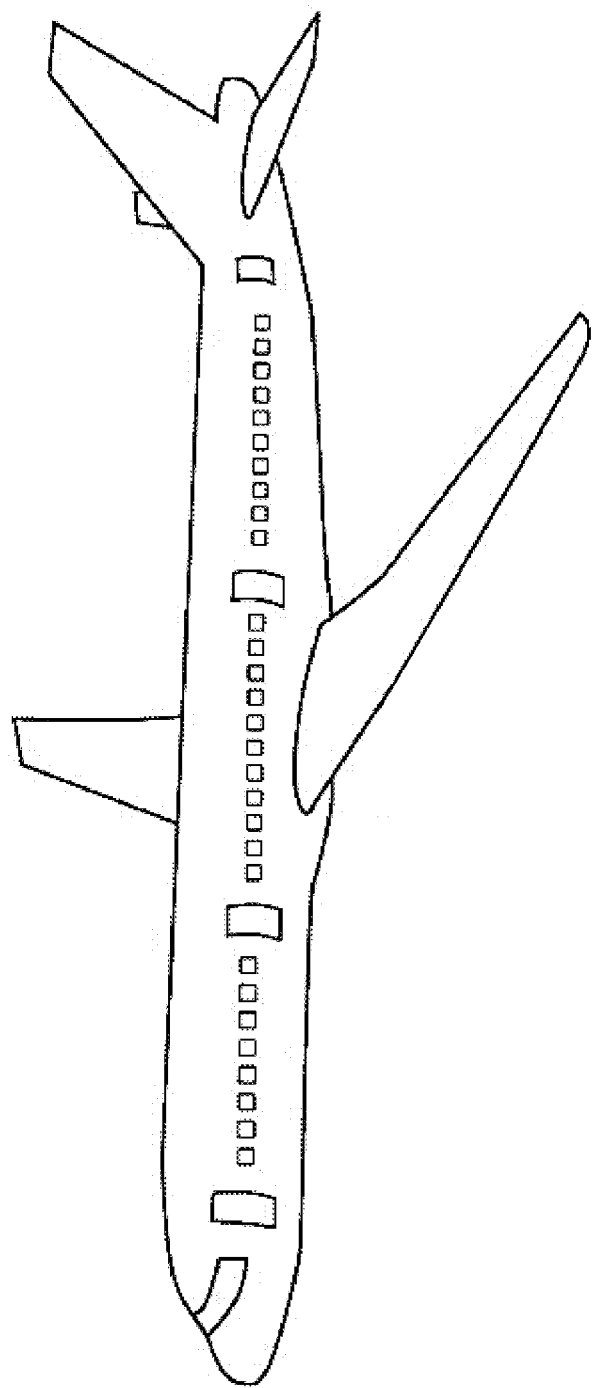
FIG. 3 depicts an aircraft that can implement the system described herein.

FIG. 3 provides an aircraft upon which the system can be installed. As noted in the example above, the overheat detection systems can be used to monitor bleed air ducts which direct hot air from the turbines to the wing anti-icing and the environmental control systems. Other areas of the aircraft can be monitored such as cargo bays, electronics equipment (EE) bays, and crew rest areas. The sensing strip can be applied to different areas of the aircraft where smoke may not be able to be visually detected. The sensing strip can indicate different levels of heat. The sensing strips can be selected for the appropriate application and heat tolerance.

It should be understood the sensing strips can be applied to any vehicle or system to detect on monitor various heat conditions.

The technical effects and benefits include providing a lightweight design where there is no need to route power or communication wires to the sensor which can be vulnerable to heat. In addition, the technical effects and benefits include a system that has a high resistance to vibration, low cost (compared to laser-based systems), high reliability, and temperature sensor immunity to electro-magnetic interference (EMI).

System integrity through the fiber optic cables and connectors would be verified by directing a high-intensity light source through the transmit fiber and ensuring it is picked up through the receiving fiber all the way through the monitoring device.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for overheat detection system using fiber optic monitoring of light reflectance changing temperature strips, the system comprising:
    a sensing strip configured to detect a temperature of an object, wherein the sensing strip comprises a plurality of regions that is activated according to corresponding temperature thresholds;
    a controller configured to monitor the sensing strip; and
    a transmit fiber optic cable configured to transmit a light signal to the sensing strip;
    a receive fiber optic cable configured to receive a light signal from the sensing strip, wherein the transmit fiber optic cable and the receive fiber optical cable are directly coupled to the sensing strip and the controller, wherein the transmit fiber optic cable and the receive fiber optic cable are different fiber optic cables.

2. The system of claim 1, further comprising a light-emitting diode configured to provide a light source to transmit the light signal to the sensing strip.

3. The system of claim 1, further comprising a photodiode configured to detect light, wherein the photodiode is coupled to at least one of the transmit fiber optic cable and the receive fiber optic cable.

4. The system of claim 1, further comprising a housing, wherein the housing enclosing the sensing strip and a portion of the transmit fiber optic cable and the receive fiber optic cable used to transmit and receive the light signal, respectively.

5. The system of claim 1, wherein the system comprises a first sensing strip and a second sensing strip to provide a redundant architecture.

6. The system of claim 1, wherein the transmit fiber optic cable and the receive fiber optic cable are bundled, wherein each bundle includes one or more transmit fiber optic cable(s) and one or more receive fiber optic cable(s).

7. The system of claim 1, wherein at least one of the transmit fiber optic cable or the receive fiber optic cable is coupled to an optical switch.

8. The system of claim 1, wherein the sensing strip is selected according to a range of temperatures to be monitored.

9. A method for operating an overheat detection system, the method comprising:
    transmitting a first signal to a sensing strip over a transmit fiber optic cable;
    receiving a second signal from the sensing strip over a receive fiber optic cable, wherein the transmit fiber optic cable and the receive fiber optic cable are different fiber optic cables;
    determining a thermal state of the sensing strip based at least in part on the sensing strip, wherein the sensing strip comprises a plurality of regions that are activated according to corresponding temperature thresholds;
    comparing the thermal state to a threshold value; and
    providing an alarm based at least in part on the comparison.

10. The method of claim 9, further comprising verifying connectivity of the overheat detection system by transmitting and receiving light signal; and
    providing a notification verification the connectivity based at least in part on the transmitted and received light signal.

11. The method of claim 9, further comprising monitoring the thermal state of the sensing strip at a periodic rate.

12. The method of claim 9, further comprising comparing a first sensing strip and a second sensing strip; and
    providing an alarm based at least in part on the comparison.

13. The method of claim 9, wherein the transmit fiber optic cable is used to transmit the first signal and a separate receive fiber optic cable is used to receive the second signal.

14. The method of claim 9, further comprising selecting the sensing strip based on a range of temperatures to be monitored.

15. The method of claim 9, wherein transmitting the first signal uses a light-emitting diode as a light source to transmit the first signal to the sensing strip.

16. The method of claim 9, wherein receiving the second signal from the sensing strip uses a photodiode to receive the second signal.

* * * * *